(12) United States Patent
Furuya et al.

(10) Patent No.: US 8,125,266 B2
(45) Date of Patent: Feb. 28, 2012

(54) POWER SUPPLY CIRCUIT FOR CHARGE PUMP CIRCUIT

(75) Inventors: Akiko Furuya, Kanagawa (JP);
Yasuhiro Tonda, Kanagawa (JP)

(73) Assignee: Renesas Electronics Corporation, Kawasaki-Shi (JP)

( * ) Notice: Subject to any disclaimer, the term of this patent is extended or adjusted under 35 U.S.C. 154(b) by 96 days.

(21) Appl. No.: 12/576,664

(22) Filed: Oct. 9, 2009

(65) Prior Publication Data
US 2010/0090754 A1  Apr. 15, 2010

(30) Foreign Application Priority Data

Oct. 15, 2008 (JP) .................................. 2008-266174

(51) Int. Cl.
*G05F 3/10* (2006.01)
(52) U.S. Cl. ........ 327/541; 327/536; 327/543; 323/312; 363/60

(58) Field of Classification Search ........................ None
See application file for complete search history.

(56) References Cited

U.S. PATENT DOCUMENTS

| 5,552,740 A | * | 9/1996 | Casper ........................ 327/541 |
| 6,577,514 B2 | | 6/2003 | Shor et al. |
| 7,656,221 B2 | * | 2/2010 | Maejima ...................... 327/534 |

* cited by examiner

*Primary Examiner* — Lincoln Donovan
*Assistant Examiner* — Terry L Englund
(74) *Attorney, Agent, or Firm* — Sughrue Mion, PLLC

(57) ABSTRACT

A boosting circuit includes a charge pump circuit; and a power supply circuit configured to supply a power supply voltage to the charge pump circuit. The power supply circuit includes an N-channel transistor connected with a power supply terminal of the charge pump circuit; and a current control circuit configured to control current flowing between the N-channel transistor and the charge pump circuit through the power supply terminal.

5 Claims, 7 Drawing Sheets

POWER SUPPLY CIRCUIT FOR CHARGE PUMP CIRCUIT

INCORPORATION BY REFERENCE

This patent application claims a priority on convention based on Japanese Patent Application NO. 2008-266174. The disclosure thereof is incorporated herein by reference.

BACKGROUND OF THE INVENTION

1. Field of the Invention

The present invention relates to a boosting circuit having a charge pump circuit.

2. Description of Related Art

Referring to FIG. 1, a boosting circuit according to a conventional technique will be described. As one example, a boosting circuit disclosed in U.S. Pat. No. 6,577,514 will be described.

The boosting circuit according to the conventional technique includes a charge pump circuit 202, a clamping regulator 206, an auxiliary charge pump circuit 208, and an N-channel transistor 214. The clamping regulator 206 compares a division voltage 204 divided from an output voltage 200 of the charge pump circuit 202 with a Vbias voltage (1.3V), and outputs a comparison result 212 to a gate of the N-channel transistor 214. A drain of the N-channel transistor 214 is connected to a power supply VDD, and a source thereof is connected to the charge pump circuit 202 as a power supply line 216. In addition, the clamping regulator 206 operates by using an output 210 (Va) of the auxiliary charge pump circuit 208.

Next, an operation of the boosting circuit according to the conventional technique will described.

(1) At a start of an operation of the charge pump circuit 202, the output voltage 200 is nearly 0V, and the division voltage 204 is lower than the "Vbias=1.3V" of clamping regulator 206. Accordingly, an output voltage (the comparison result 212) of the clamping regulator 206 is Va. That is, a gate voltage of the N-channel transistor 214 is Va, and a potential difference between the gate and the source of the N-channel transistor 214 is "(Va)−(Va−Vt)=Vt" (a threshold voltage of the N-channel transistor 214). Consequently, the N-channel transistor 214 is turned on, a current is supplied to the charge pump circuit 202, and the charge pump circuit 202 continues a boosting operation.

(2) In the boosting operation of the charge pump circuit 202, when the division voltage 204 becomes higher than the "Vbias=1.3V" supplied to the clamping regulator 206, the comparison result 212 becomes a voltage Vb lower than the Va. In this case, the potential difference between the gate and the source in the N-channel transistor 214 is the "(Vb)−(Va−Vt)=Vt", and becomes lower than the threshold voltage Vt. Accordingly, the N-channel transistor 214 is turned off or nearly turned off and an amount of current supplied to the charge pump circuit 202 reduces. In this case, the charge pump circuit 202 cannot continue the boosting operation and the output voltage 200 decreases.

(3) When the output voltage 200 of the charge pump circuit 202 has decreased, the division voltage 204 also decreases. When the division voltage 204 becomes lower than the "Vbias=1.3V" supplied to the clamping regulator 206, the voltage level of the comparison result 212 returns to the voltage Va. That is, the gate voltage of the N-channel transistor 214 becomes Va, and the potential difference between the gate and the source in the N-channel transistor 214 becomes "(Va)−(Va−Vt)=Vt" (the threshold voltage of the N-channel transistor 214). Consequently, the N-channel transistor 214 is turned on, a current is supplied to the charge pump circuit 202, and the charge pump circuit 202 starts the boosting operation again.

(4) When continuing the boosting operation to set the state (2), the charge pump circuit 202 becomes the state (3) again. After repeating this operation, the output voltage of the charge pump circuit 202 will be in an approximately-constant level.

When the charge pump circuit 202 starts the boosting operation again in the above-mentioned state (3), a large instantaneous pass-through current flows from a power supply wiring to a drive circuit for driving a boost capacitor. In addition, charge and discharge currents flow to and from the boost capacitor in the charge pump circuit 202. In this manner, a voltage of the power supply line 216 of the charge pump circuit 202 decreases, and the potential difference between the gate and the source in the N-channel transistor 214 becomes larger than the threshold value of the N-channel transistor 214. That is, when the charge pump circuit 202 restarts the boosting operation, a current supply ability of the N-channel transistor 214 becomes large and thus the boosting operation ability of the charge pump circuit 202 is improved only for a short period. Consequently, a large current (hereinafter, to be referred to as a peak current) flows from the power supply wiring to the charge pump circuit 202 via the N-channel transistor 214.

FIG. 2 is a diagram showing a temporal change of a current flowing from the charge pump circuit 202 according to the conventional technique to the power supply terminal 216. Referring to FIG. 2, the current flowing from the charge pump circuit 202 to the power supply terminal 216 approximately has a value of 0 A at time T1 when the boosting circuit does not operate; however, the peak current of 230 mA flows at time T2 when the operation starts. As described above, when the charge pump circuit 202 starts the boosting operation, the large peak current flows to a power supply wiring and a GND wiring.

Generally, in an integrated circuit, various types of circuits such as a memory circuit, an analog circuit, and a logic circuit are connected to the power supply wiring or the GND wiring. When a large current I1 flows between these circuits and the power supply wiring, the voltage drop (of I1×R) occurs because of a power supply wiring resistance R. Or, when a large current I2 flows between these circuits and the GND wiring, the voltage rise (of I2×R2) occurs because of a GND wiring resistance R2. When the logic circuit is connected to the power supply wiring, the voltage of the power supply wiring drops and the voltage of the GND wiring rises. Thus, the power supply voltage supplied to the logic circuit becomes a voltage lower by "I1×R", and the GND voltage becomes a voltage higher by "I2×R2", resulting in a narrow power supply voltage margin. When the power supply voltage margin is smaller, an operation speed of the logic circuit sometimes decreases and a calculation result is sometimes reversed. For example, when an SRAM is connected to portions where the voltage of the power supply wiring dropped and the voltage of the GND wiring rose, a data retention state of a memory cell of the SRAM may be destroyed.

Since the miniaturizing progress in the present integrated circuit and accordingly cross-section areas of the power supply wiring and the GND wiring are reduced, wiring resistances tend to increase. Thus, the voltage drop of the power supply wiring and the voltage rise of the GND wiring are intensified because of the large peak current generated in the boosting circuit, and the power supply voltage margin to the circuit is further narrowed. In addition, since the peak current is temporarily generated, the power supply voltage becomes unstable. When the power supply voltage margin is narrowed and the power supply voltage becomes more unstable (a fluctuation) as described above, possibility of malfunction and functional deterioration is further increased.

SUMMARY OF THE INVENTION

In an aspect of the present invention, a boosting circuit includes a charge pump circuit; and a power supply circuit configured to supply a power supply voltage to the charge pump circuit. The power supply circuit includes an N-channel transistor connected with a power supply terminal of the charge pump circuit; and a current control circuit configured to control current flowing between the N-channel transistor and the charge pump circuit through the power supply terminal.

According to the present invention, fluctuation of a voltage in a power supply wiring and a GND wiring can be reduced by suppressing a peak current generated in a boosting circuit.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF THE EMBODIMENTS

Hereinafter, a boosting circuit of the present invention will be described with reference to the attached drawings.

Figure 1:
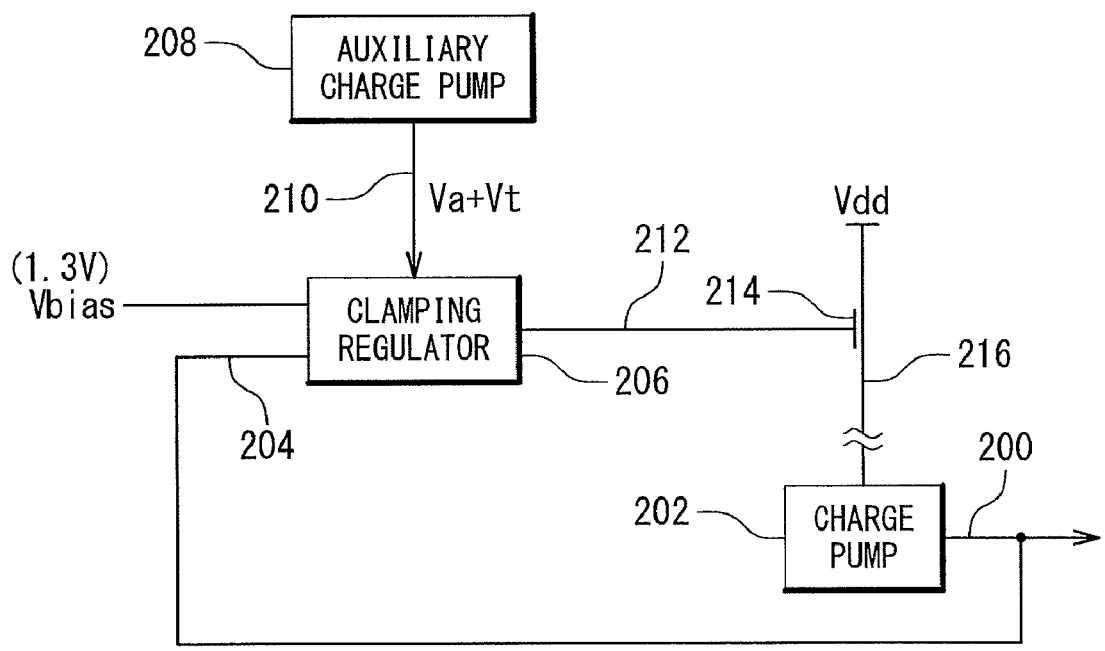
FIG. 1 is a block diagram showing a configuration of a boosting circuit according to a conventional technique.
Figure 2:
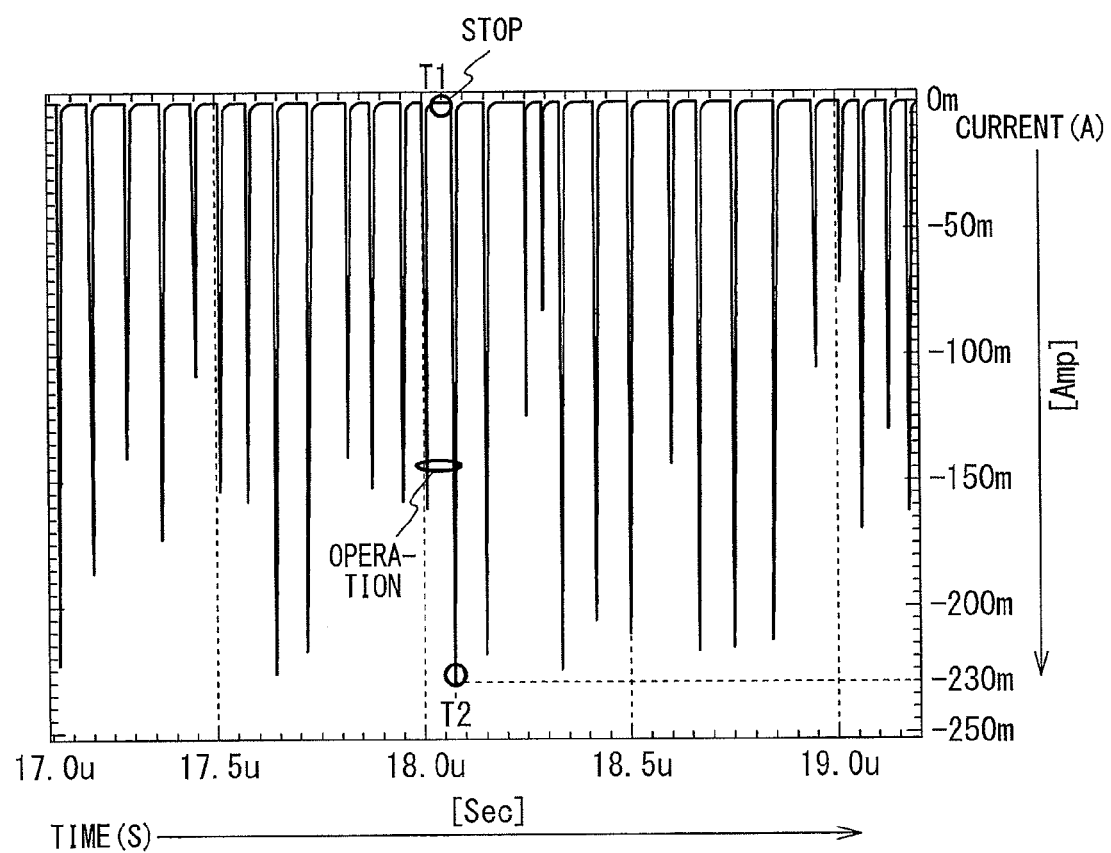
FIG. 2 is a diagram showing temporal change of current flowing between a charge pump circuit and a power supply in the boosting circuit according to the conventional technique.
Figure 3:
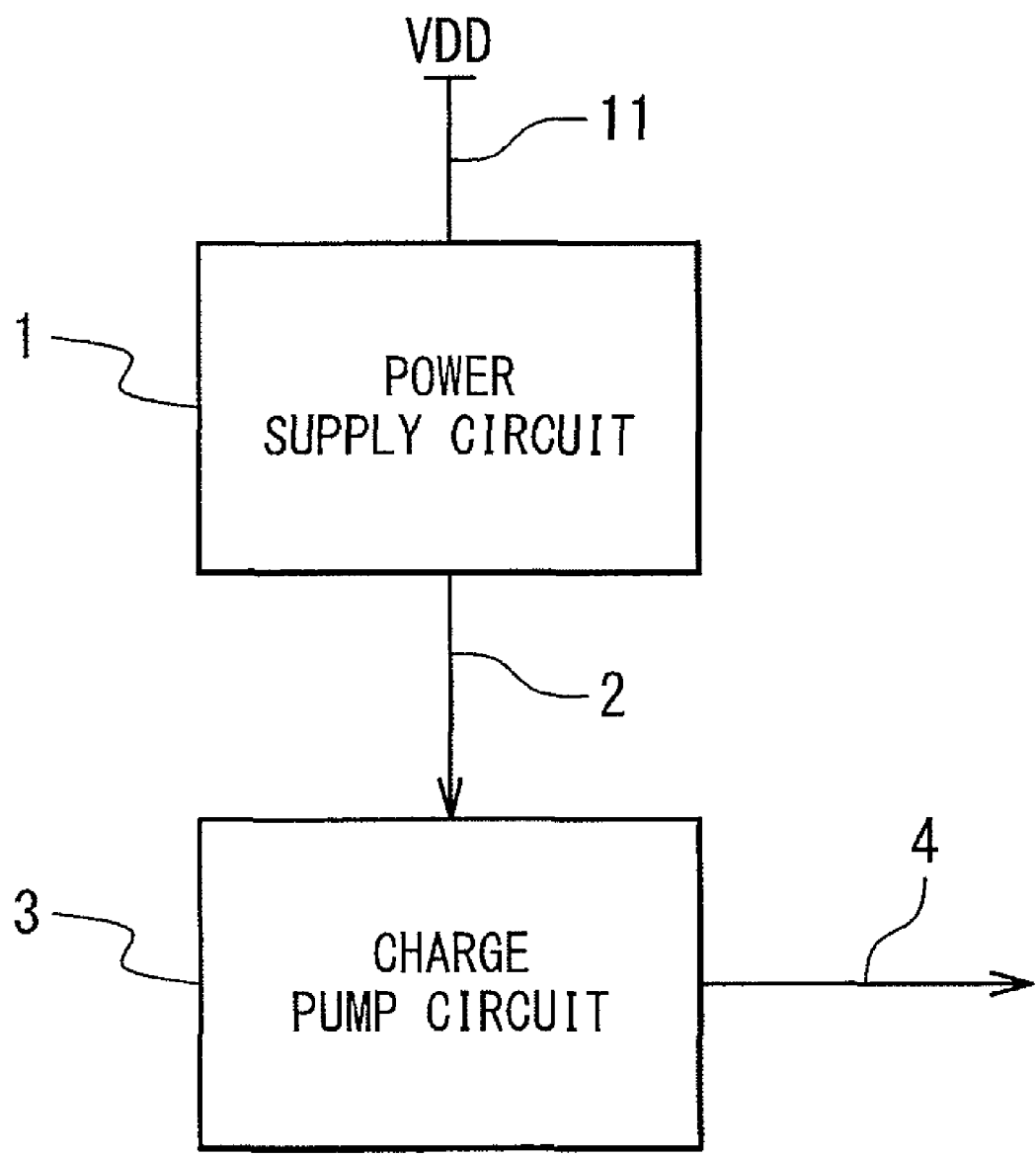
FIG. 3 is a block diagram showing a configuration of a boosting circuit according to the present invention.

FIG. 3 is a block diagram showing a configuration of the boosting circuit according to the present invention. The boosting circuit according to the present invention includes a power supply circuit 1 having a current control circuit, and a charge pump circuit 3 that operates on the basis of a power supply voltage supplied from the power supply circuit 1.

The power supply circuit 1 supplies the power supply voltage to the charge pump circuit 3 based on a first power supply voltage VDD supplied via a power supply terminal 11. Here, the first power supply voltage VDD is supplied from a power supply wiring, which is connected to another circuit (not shown), to the power supply terminal 11.

The charge pump circuit 3 includes a boost capacitor (not shown) and a drive circuit for controlling the charging and discharging operations of the boost capacitor. The power supply voltage is supplied from the power supply circuit 1 to the charge pump circuit 3 via the power supply terminal 2, and the charge pump circuit 3 boosts an input voltage (not shown) and outputs the boosted voltage to an output terminal 4. The charge pump circuit 3 stops the boosting operation when a voltage of the output terminal 4 (hereinafter, to be referred to as an output voltage) reaches a predetermined voltage, and starts the boosting operation when the voltage becomes lower than the predetermined voltage.

When the charge pump circuit 3 starts its operation, charge and discharge currents of the boost capacitor and a pass-through current of a drive circuit to drive the boost capacitor flow. In this manner, a voltage of the power supply terminal 2 of the charge pump circuit 3 drops. The voltage drop in the power supply terminal 2 varies depending on a current flowing between the power supply terminal 2 and the charge pump circuit 3. The power supply circuit 1 includes a current suppressing function (a current control circuit), and suppresses the current flowing between the power supply terminal 2 and the charge pump circuit 3 on the basis of the voltage drop in the power supply terminal 2. In this manner, the current which flows between the boosting circuit and the power supply wiring, and increases in a boosting operation is suppressed and the voltage drop in the power supply wiring is reduced.

First Embodiment

Figure 4:
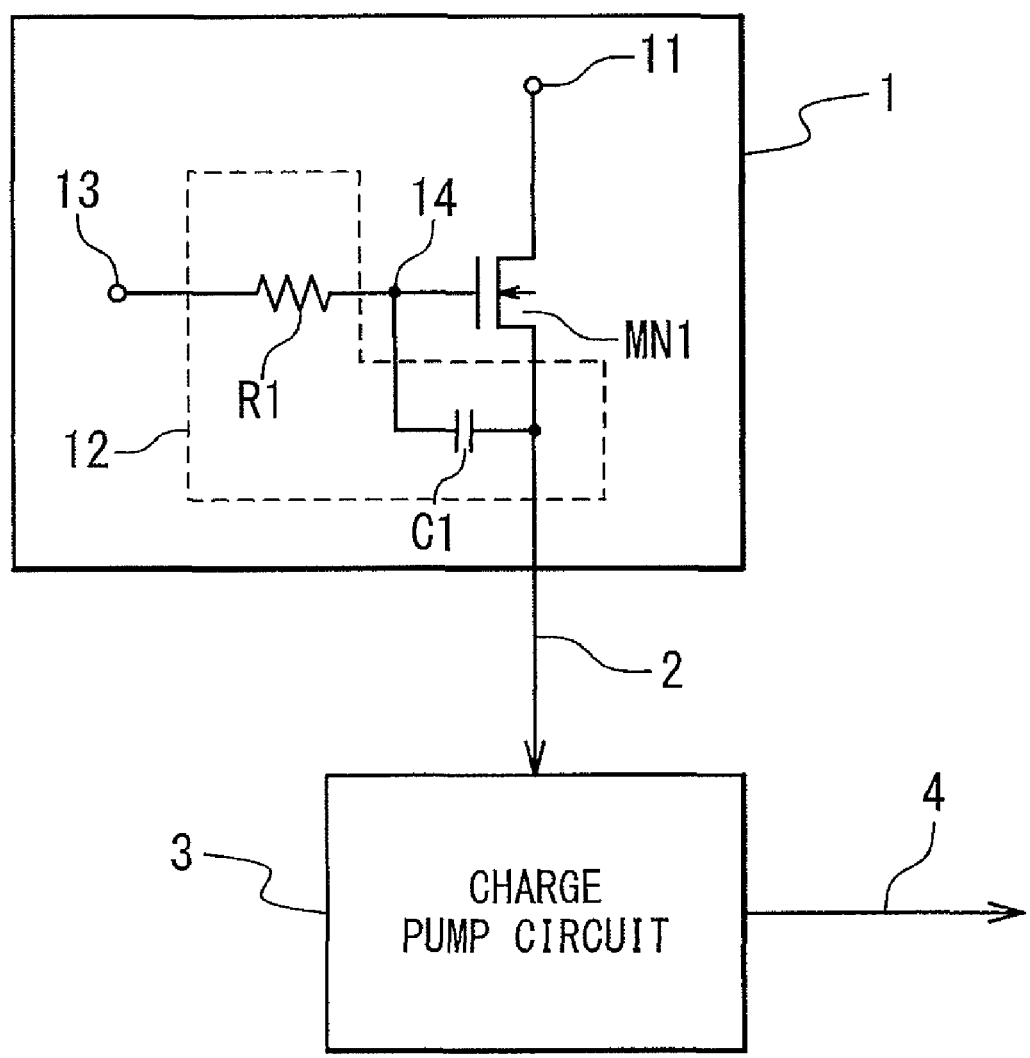
FIG. 4 is a circuit block diagram showing a configuration of the boosting circuit according to a first embodiment of the present invention.

FIG. 4 is a block diagram showing a configuration of the boosting circuit according to a first embodiment of the present invention. Referring to FIG. 4, the power supply circuit 1 in the first embodiment will be described.

The power supply circuit 1 in the first embodiment includes an N-channel MOS transistor MN1 connected in series with a current control circuit 12 between the power supply terminal 11 to which the first power supply voltage VDD is supplied and the power supply terminal 2 of the charge pump circuit 3. A drain of the N-channel transistor MN1 is connected to the power supply terminal 11 to which the first power supply voltage VDD is supplied, and a source is connected to the power supply terminal 2. A gate 14 of the N-channel transistor MN1 is connected via the current control circuit 12 to a terminal 13 to which a constant voltage is supplied.

The current control circuit 12 in the first embodiment includes a capacitance C1 connected between the gate 14 of the N-channel transistor MN1 and the power supply terminal 2; and a resistance R1 connected between the gate 14 of the N-channel transistor MN1 and the terminal 13. The constant voltage is supplied from the terminal 13 to the power supply terminal 2 by the current control circuit 12 via the resistance R1 and the capacitance C1. It is preferred that a resistance value of the resistance R1 is sufficiently larger than a value of an ON-resistance of the N-channel transistor MN1. In addition, it is preferable that a capacitance value of the capacitance C1 is also larger than a gate capacitance of the N-channel transistor MN1. For example, the resistance value of the resistance R1 in the present embodiment is set to be more than one hundred times as large as that of the on-resistance of the N-channel transistor MN1, and the capacitance value of the capacitance C1 is set to be more than two times as large as the gate capacitance of the N-channel transistor MN1.

Next, an operation of the power supply circuit 1 in the first embodiment will be described. Here, it is assumed that a voltage supplied to the terminal 13 is 3.5V and the voltage VDD supplied to the power supply terminal 11 is 5.0V. In addition, it is assumed that a threshold voltage of the N-channel transistor MN1 is Vtn.

(1) At first, since the voltage of the terminal 13 is 3.5V, the voltage of the gate 14 is 3.5V. In this case, the source voltage of the N-channel transistor MN1 becomes "3.5V−Vtn". When the charge pump circuit 3 starts the operation under this condition, the voltage of the output terminal 4 starts the increase from 0V. At this time, a large current of charge and discharge currents of the boost capacitor in the charge pump circuit 3 and a pass-through current passing through a drive circuit for the boost capacitor is likely to flow through the power supply terminal 2 of the charge pump circuit 3. Accordingly, a voltage of the power supply terminal 2 of the charge pump circuit 3 temporarily becomes lower than "3.5V−Vtn". In addition, the voltage 3.5V of the gate 14 also drops via the capacitance C1 with the voltage drop of the power supply terminal 2. Here, a resistance value of the resistance R1 is sufficiently large, and the gate 14 is connected to the power supply terminal 2 via the capacitance C1. For this reason, the voltage of the gate 14 drops by the voltage drop of the power supply terminal 2 in accordance with the law of conservation of charge of the capacitance C1. Accordingly, the potential difference between the gate and the source in the N-channel transistor MN1 is constantly maintained at the threshold voltage Vtn (the same state as a state before the start of the boosting operation), and the current flowing to the N-channel transistor MN1 becomes constant. The charge pump circuit 3 carries out the boosting operation in this state, and the voltage of the output terminal 4 continues the increase toward the predetermined voltage. Since the capacitance C1 is charged with the constant voltage supplied from the terminal 13 via the resistance R1 in the boosting operation, the voltage of the gate 14 rises toward 3.5V. As the gate voltage of the N-channel transistor MN1 increases toward 3.5V, the power supply terminal 2 becomes "3.5V−Vtn" and thus the current flowing through the N-channel transistor MN1 is maintained to be a constant state.

(2) When the output voltage of the charge pump circuit 3 reaches the predetermined voltage, the charge pump circuit 3 stops the boosting operation. Accordingly, a current flowing through the power supply terminal 2 of the charge pump circuit 3 reduces, and the voltage of the power supply terminal 2 becomes constant in the vicinity of "the voltage 3.5V−Vtn of the gate 14".

(3) When the output voltage of the charge pump circuit 3 becomes lower than the predetermined voltage, the charge pump circuit 3 starts the boosting operation again, and the voltage of the output terminal 4 starts the increase. At this time, the large current of the charge and discharge currents of the boost capacitor in the charge pump circuit 3 and the pass-through current passing through the drive circuit for driving the boost capacitor is likely to flow through the power supply terminal 2 of the charge pump circuit 3. Accordingly, the voltage of the power supply terminal 2 of the charge pump circuit 3 temporarily becomes lower than "3.5V−Vtn". In addition, the voltage 3.5V of the gate 14 drops via the capacitance C1 with the voltage drop of the power supply terminal 2. Here, the resistance value of the resistance R1 is sufficiently large, and the gate 14 is connected to the power supply terminal 2 via the capacitance C1. For this reason, the voltage of the gate 14 drops by the voltage drop of the power supply terminal 2 in accordance with the law of conservation of charge of the capacitance C1. Thus, the potential difference between the gate and the source in the N-channel transistor MN1 is constantly maintained at the threshold voltage Vtn (the same state as the state before the start of the boosting operation), and the current flowing through the N-channel transistor MN1 becomes constant. The charge pump circuit 3 carries out the boosting operation in this state, and the voltage of the output terminal 4 continues the increase toward the predetermined voltage. Since the capacitance C1 is charged by the constant voltage supplied from the terminal 13 via the resistance R1 during the boosting operation, the voltage of the gate 14 rises toward 3.5V. As the gate voltage of the N-channel transistor MN1 increases toward 3.5V, the power supply terminal 2 becomes "3.5V−Vtn" and thus the current flowing through the N-channel transistor MN1 is maintained to be a constant state.

(4) When the output voltage of the charge pump circuit 3 reaches the predetermined voltage, the charge pump circuit 3 stops the boosting operation.

Accordingly, the current flowing through the power supply terminal 2 of the charge pump circuit 3 reduces, and the voltage of the power supply terminal 2 becomes constant in the vicinity of "the voltage 3.5V−Vtn of the gate 14".

Next, the output terminal 4 of the charge pump circuit 3 starts the voltage drop to be lower than the predetermined voltage, and the boosting circuit changes to the state (3) again, and repeats the states (3) and (4). Then, the voltage of the output terminal 4 of the charge pump circuit 3 becomes constant at the predetermined voltage.

Figure 5:
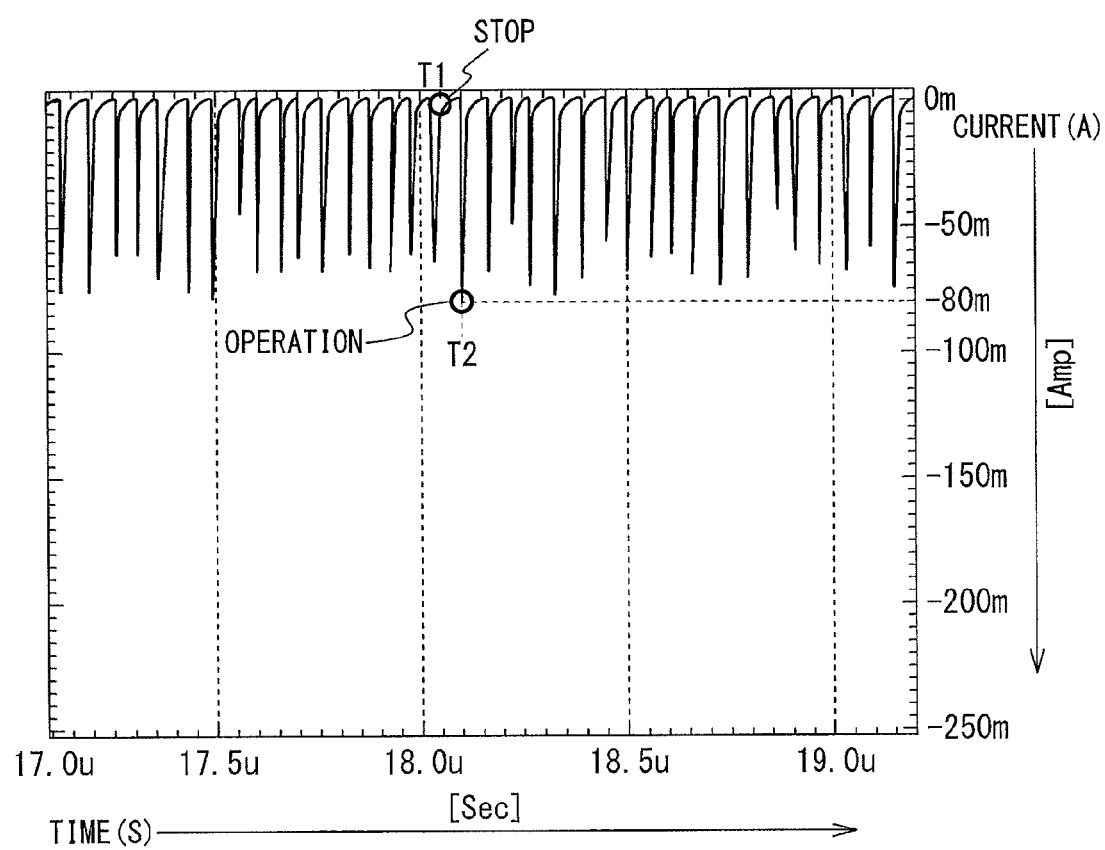
FIG. 5 is a diagram showing temporal change of current flowing between a charge pump circuit and a power supply in the boosting circuit according to the present invention.

FIG. 5 is a diagram showing temporal change of the current flowing from the charge pump circuit 3 to the power supply terminal 2 in the present invention. Referring to FIG. 5, at time T1 when the charge pump circuit 3 does not carry out the boosting operation, the current flowing from the charge pump circuit 3 to the power supply terminal 2 is a value close to 0 A. Meanwhile, at time T2 when the boosting operation starts, the current between the charge pump circuit 3 and the power supply terminal 2 instantaneously increases (the peak current). However, in the power supply circuit 1 according to the first embodiment, the potential difference between the gate and the source in the N-channel transistor MN1 is controlled by the resistance R1 and the capacitance C1 to be in the vicinity of the threshold voltage of the N-channel transistor MN1. Accordingly, the power supply circuit 1 operates in such a manner that the current flowing through the N-channel transistor MN1 can be maintained to be a constant value, and the peak current flowing into the charge pump circuit 3 is suppressed. For example, as shown in FIG. 5, a peak value of the current flowing between the power supply terminal 2 and the charge pump circuit 3 becomes approximately 80 mA in the boosting operation (time T2), and decreases significantly compared to approximately 230 mA of the conventional technique.

As described above, according to the present invention, the peak current flowing between the power supply terminal 2 and the charge pump circuit 3 is suppressed. In this manner, the increase of the current flowing through the boosting circuit and the power supply wiring (the power supply terminal 11) is suppressed, and the voltage drop of the power supply wiring and the voltage rise of the GND wiring which are due to the current increase, can be reduced. As a result, a decrease of an operational speed of the logic circuit connected to a same power supply wiring and the GND wiring is alleviated. Also, when an SRAM is connected to the same power supply wiring, destruction of a data held in a memory cell of the SRAM is eliminated.

Second Embodiment

Figure 6:
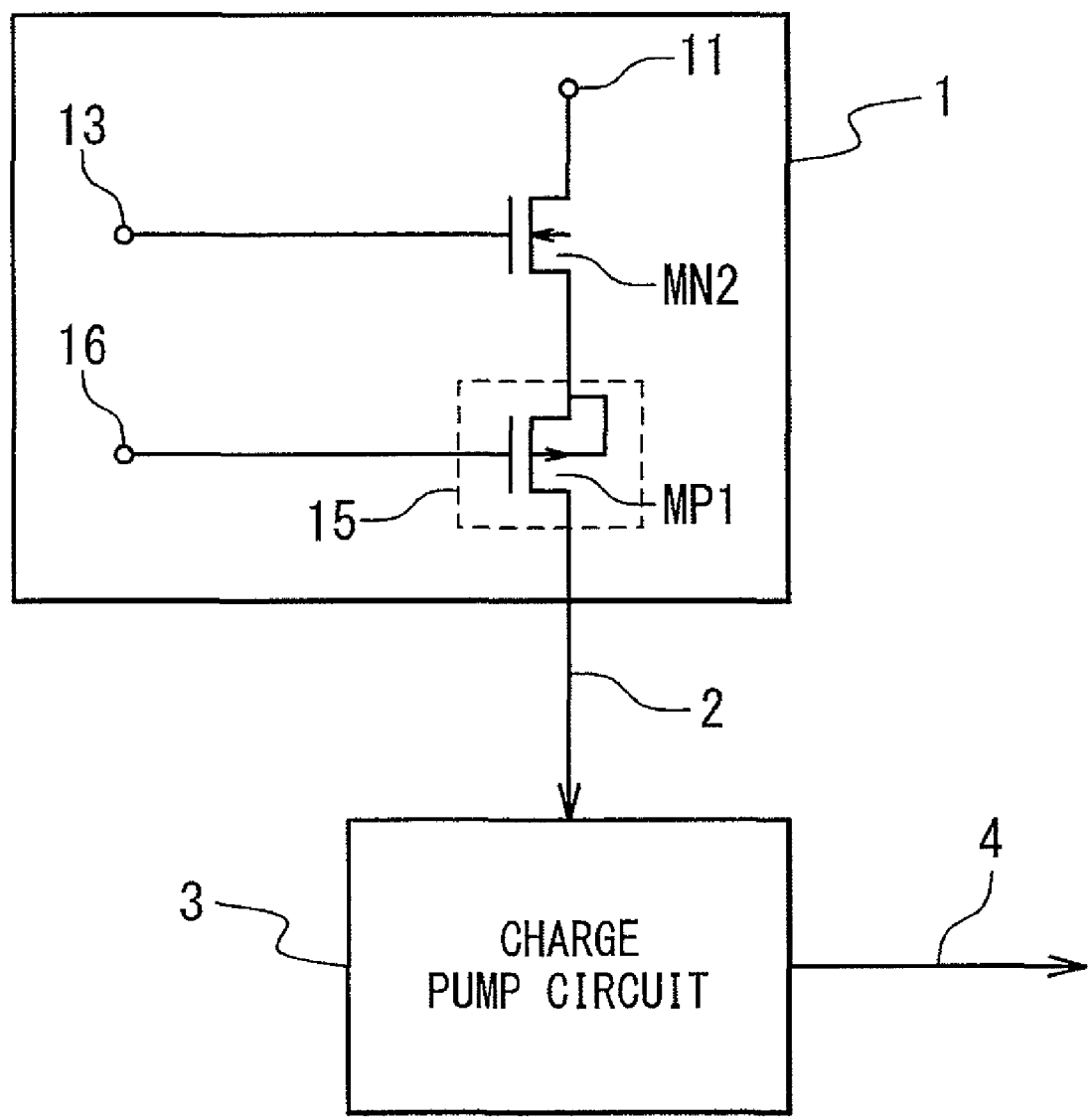
FIG. 6 is a circuit block diagram showing a configuration of the boosting circuit according to a second embodiment of the present invention.

FIG. 6 is a circuit block diagram showing a configuration of the boosting circuit according to a second embodiment of the present invention. In the boosting circuit according to the second embodiment, a configuration of the power supply circuit 1 is different from the first embodiment, and the other configuration is the same as that of the boosting circuit in the first embodiment. Referring to FIG. 6, the power supply circuit 1 according to the second embodiment will be described.

The power supply circuit 1 according to the second embodiment includes an N-channel MOS transistor MN2 connected in series with a P-channel MOS transistor MP1 (a current control circuit 15) between the power supply terminal 11 to which a first power supply voltage VDD is supplied and the power supply terminal 2 of the charge pump circuit 3. A drain of the N-channel transistor MN2 is connected to the power supply terminal 11 to which the first power supply voltage VDD is supplied, and a source is connected to a source and a back gate of the P-channel transistor MP1. In addition, a gate of the N-channel transistor MN2 is connected to the terminal 13, and a first constant voltage is supplied from the terminal 13. A drain of the P-channel transistor MP1 is connected to the power supply terminal 2 of the charge pump circuit 3, and the source and the back gate is connected to the source of the N-channel transistor MN2 in common. In addition, a gate of the P-channel transistor MP1 is connected to a terminal 16, and a second constant voltage is supplied from the terminal 16.

Next, an operation of the power supply circuit 1 according to the second embodiment will be described. Here, it is assumed that a voltage supplied to the terminal 13 is 4.5V, a voltage VDD supplied to the terminal 11 is 5.0V, and a voltage supplied to the terminal 16 is 2.5V. In addition, it is assumed that a threshold voltage of the N-channel transistor MN2 is Vtn and a threshold voltage of the P-channel transistor MP1 is Vtp.

(1) At first, since the voltage of the terminal 13 is 4.5V, the voltage of the source of the N-channel transistor MN2 is "4.5V−Vtn". In addition, since the voltage of the terminal 16 is 2.5V, the voltage between the source and the gate in the P-channel transistor MP1 is "(4.5V−Vtn)−2.5V", and is larger than the threshold value Vtp of the P-channel transistor MP1. Accordingly, the P-channel transistor MP1 is in an on-state, and the power supply terminal 2 of the charge pump circuit 3 is "4.5V−Vtn". When the charge pump circuit 3 starts the operation under this condition, a voltage of the output terminal 4 starts the increase from 0V. At this time, a large current of charge and discharge currents of the boost capacitor in the charge pump circuit 3 and a pass-through current to the drive circuit is likely to flow through the power supply terminal 2 of the charge pump circuit 3. Accordingly, a voltage of the power supply terminal 2 of the charge pump circuit 3 temporarily becomes lower than "4.5V−Vtn". Thus, since the source voltage of the P-channel transistor MP1 also becomes lower than "4.5V−Vtn", a potential difference between the gate and the source in the P-channel transistor MP1 is reduced and a current flowing through the P-channel transistor MP1 reduces. In this manner, the current flowing between the power supply terminal 2 and the charge pump circuit 3 is suppressed in starting the boosting operation, and the peak current generated in start the operation of the charge pump circuit 3 reduces. When the charge pump circuit 3 carries out the boosting operation in this state, the output voltage continues the increase toward the predetermined voltage. As the output voltage of the charge pump circuit 3 increases, the current flowing from the power supply terminal 2 to the charge pump circuit 3 starts reducing, and the source voltage of the N-channel transistor MN2 becomes "4.5V−Vtn"

(2) When the output voltage of the charge pump circuit 3 reaches the predetermined voltage, the charge pump circuit 3 stops the boosting operation. Accordingly, a current flowing through the power supply terminal 2 of the charge pump circuit 3 reduces, and the voltages of the sources of the N-channel transistor MN2 and the P-channel transistor MP1, and the power supply terminal 2 become constant in the vicinity of "4.5V−Vtn".

(3) When the output voltage of the charge pump circuit 3 becomes lower than the predetermined voltage, the charge pump circuit 3 starts the boosting operation again, and the voltage of the output terminal 4 starts the increase. At this time, the large current of the charge and discharge currents of the boost capacitor in the charge pump circuit 3 and the pass-through current to the drive circuit is likely to flow through the power supply terminal 2 of the charge pump circuit 3. Accordingly, the voltage of the power supply terminal 2 of the charge pump circuit 3 temporarily becomes lower than "4.5V−Vtn". Thus, because the source voltage of the P-channel transistor MP1 becomes lower than "4.5V−Vtn", the potential difference between the gate and the source in the P-channel transistor MP1 reduces and the current flowing through the P-channel transistor MP1 reduces. In this manner, the current flowing between the power supply terminal 2 and the charge pump circuit 3 is suppressed in the boosting operation, and the peak current generated at the start of the operation of the charge pump circuit 3 reduces. The charge pump circuit 3 carries out the boosting operation in this state, and the output voltage continues the increase toward the predetermined voltage. As the output voltage of the charge pump circuit 3 increases, the current flowing from the power supply terminal 2 to the charge pump circuit 3 starts reducing, and the source voltage of the N-channel transistor MN2 becomes "4.5V−Vtn".

(4) When the output voltage of the charge pump circuit 3 reaches the predetermined voltage, the charge pump circuit 3 stops the boosting operation. Therefore, a current flowing through the power supply terminal 2 of the charge pump circuit 3 reduces, and the voltages of the sources of the N-channel transistor MN2 and the P-channel transistor MP1, and the power supply terminal 2 becomes constant in the vicinity of "4.5V−Vtn".

Next, the voltage of the output terminal 4 of the charge pump circuit 3 starts the voltage drop to be lower than the predetermined value, and the boosting circuit changes to the state (3) again, and repeats states (3) and (4). Then, the voltage of the output terminal 4 of the charge pump circuit 3 becomes constant at the predetermined voltage.

In the first embodiment, the peak current flowing through the charge pump circuit 3 is suppressed through the operation for maintaining the current flowing between the power supply terminal 2 and the charge pump circuit 3 at a constant value. On the other hand, in the second embodiment, when the current flowing between the power supply terminal 2 and the charge pump circuit 3 instantaneously increases, the peak current in the charge pump circuit 3 is suppressed by suppressing the current through use of the P-channel transistor MP1. For this reason, the boosting circuit according to the second embodiment has a function of efficiently reducing a current in the voltage drop (voltage rise) due to the wiring resistances of the power supply wiring and the GND wiring. As a result, reduction of an operation speed of the logic circuit connected to the same power supply wiring and the GND wiring is alleviated. Also, when an SRAM is connected to the same power supply wiring, destruction of a data held in a memory cell of the SRAM is eliminated.

Third Embodiment

Figure 7:
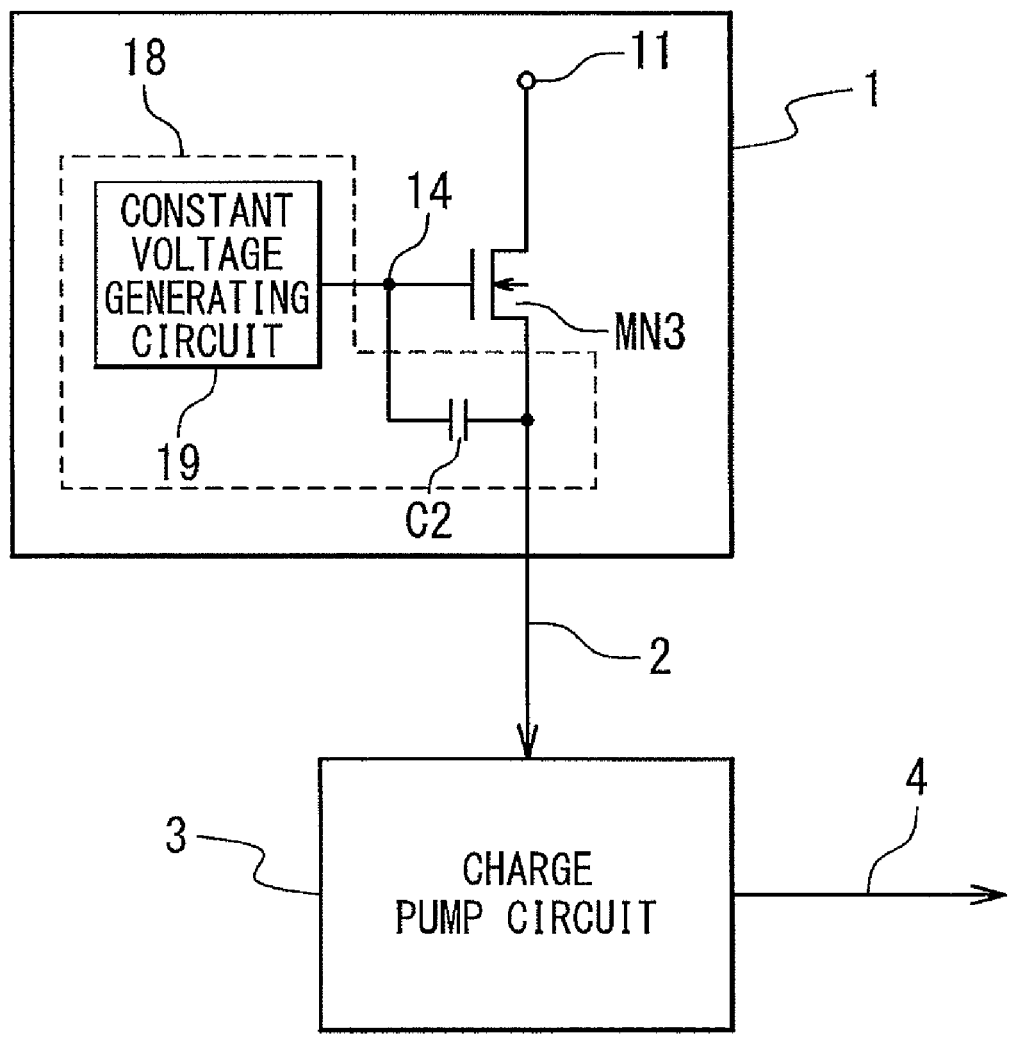
FIG. 7 is a circuit block diagram showing a configuration of the boosting circuit according to a third embodiment of the present invention.

FIG. 7 is a diagram showing a configuration of a boosting circuit according to a third embodiment of the present invention. In the boosting circuit according to the third embodiment, a configuration of the power supply circuit 1 is different from the first embodiment, and other configurations are the same as those of the boosting circuit in the first embodiment. Referring to FIG. 7, the power supply circuit 1 according to the third embodiment will be described.

The power supply circuit 1 according to the third embodiment includes an N-channel MOS transistor MN3 connected in series with a current control circuit 18 between the power supply terminal 11 to which a first power supply voltage VDD is supplied and a power supply terminal 2 of the charge pump circuit 3. A drain of the N-channel transistor MN3 is connected to the power supply terminal 11 to which the first power supply voltage VDD is supplied, and a source is connected to the power supply terminal 2. A gate 14 of the N-channel transistor MN3 is connected to the current control circuit 18.

The current control circuit 18 according to the third embodiment includes a capacitance C2 connected between the gate 14 of the N-channel transistor MN3 and the power supply terminal 2; and a constant voltage generating circuit 19 connected to the gate 14 of the N-channel transistor MN3. It is preferable that a capacitance value of the capacitance C2 is larger than the gate capacitance of the N-channel transistor MN3, as in the first embodiment. For example, the capacitance value of the capacitance C2 is twice as large as the gate capacitance of the N-channel transistor MN3. The constant voltage generating circuit 19 is a second charge pump circuit for generating a constant voltage.

Next, an operation of the power supply circuit 1 in the third embodiment will be described. Here, it is assumed that an output voltage of the constant voltage generating circuit 19 is 3.5V and the voltage VDD supplied to the power supply terminal 11 is 5.0V. In addition, it is assumed that a threshold voltage of the N-channel transistor MN3 is Vtn.

(1) At first, since the output voltage of the constant voltage generating circuit 19 is 3.5V, the source voltage of the N-channel transistor MN3 becomes "3.5V–Vtn". When the charge pump circuit 3 starts the operation under this condition, the voltage of the output terminal 4 starts the increase from 0V. At this time, a large current of charge and discharge currents of the boost capacitor in the charge pump circuit 3 and a pass-through current to the drive circuit is likely to flow through the power supply terminal 2 of the charge pump circuit 3. Accordingly, a voltage of the power supply terminal 2 of the charge pump circuit 3 temporarily becomes lower than "3.5V–Vtn". In addition, the voltage of the gate 14 also drops from 3.5V via the capacitance C2 with the voltage drop of the power supply terminal 2. Here, an output impedance of the constant voltage generating circuit 19 is sufficiently large, and the gate 14 is connected to the power supply terminal 2 via the capacitance C2. For this reason, the voltage of the gate 14 drops by the voltage drop of the power supply terminal 2 in accordance with the law of conservation of charge of the capacitance C2. Accordingly, the potential difference between the gate and the source in the N-channel transistor MN3 is constantly maintained at the threshold voltage Vtn (the same state as the state before the start of the boosting operation), and the current flowing through the N-channel transistor MN3 becomes constant. The charge pump circuit 3 carries out the boosting operation in this state, and the voltage of the output terminal 4 continues the increase toward the predetermined voltage. Since the capacitance C2 is charged with the constant voltage supplied from the constant voltage generating circuit 19 in the boosting operation, the voltage of the gate 14 increases toward 3.5V. In addition, as the gate voltage of the N-channel transistor MN3 increases toward 3.5V, the power supply terminal 2 becomes "3.5V–Vtn" and thus the current flowing through the N-channel transistor MN3 is maintained to be a constant state.

(2) When the output voltage of the charge pump circuit 3 reaches the predetermined voltage, the charge pump circuit 3 stops the boosting operation. Accordingly, a current flowing through the power supply terminal 2 of the charge pump circuit 3 reduces, and the voltage of the power supply terminal 2 becomes constant in the vicinity of "the voltage 3.5V–Vtn of the gate 14".

(3) When the output voltage of the charge pump circuit 3 becomes lower than the predetermined voltage, the charge pump circuit 3 starts the boosting operation again, and the voltage of the output terminal 4 starts the increase. At this time, the large current of the charge and discharge currents of the boost capacitor in the charge pump circuit 3 and the pass-through current to the drive circuit is likely to flow through the power supply terminal 2 of the charge pump circuit 3. Accordingly, the voltage of the power supply terminal 2 of the charge pump circuit 3 temporarily becomes lower than "3.5V–Vtn". In addition, the voltage of the gate 14 drops from 3.5V via the capacitance C2 with the voltage drop of the power supply terminal 2. Here, the output impedance of the constant voltage generating circuit 19 is sufficiently large, and the gate 14 is connected to the power supply terminal 2 via the capacitance C2. For this reason, the voltage of the gate 14 drops by the voltage drop of the power supply terminal 2 in accordance with the law of conservation of charge of the capacitance C2. Accordingly, the potential difference between the gate and the source in the N-channel transistor MN3 is constantly maintained at the threshold voltage Vtn (the same state as the state before the starting of the boosting operation), and the current flowing through the N-channel transistor MN3 becomes constant. The charge pump circuit 3 carries out the boosting operation in this state, and the voltage of the output terminal 4 continues the increase toward the predetermined voltage. Since the capacitance C2 is charged with the constant voltage supplied from the constant voltage generating circuit 19, the voltage of the gate 14 increases toward 3.5V. In addition, as the gate voltage of the N-channel transistor MN3 increases toward 3.5V, the power supply terminal 2 becomes "3.5V–Vtn" and thus the current flowing through the N-channel transistor MN3 is maintained to be in a constant state.

(4) When the output voltage of the charge pump circuit 3 reaches the predetermined voltage, the charge pump circuit 3 stops the boosting operation. Accordingly, a current to the power supply terminal 2 of the charge pump circuit 3 reduces, and the power supply terminal 2 becomes constant in the vicinity of the voltage 3.5V–Vtn of the gate 14".

Next, the output terminal 4 of the charge pump circuit 3 starts the voltage drop to be lower than the predetermined voltage, and the boosting circuit changes to the state (3) again, and repeats the states (3) and (4). Then, the voltage of the output terminal 4 of the charge pump circuit 3 becomes constant at the predetermined voltage.

In the boosting circuit according to the third embodiment, the potential difference between the gate and the source in the N-channel transistor MN3 is constantly in the vicinity of the threshold voltage of the N-channel transistor MN3 by using the constant voltage generating circuit 19 and the capacitance C2. Accordingly, in the third embodiment, a peak current flowing between the power supply terminal 2 and the charge pump circuit 3 is suppressed in the same manner as that of the first embodiment. In this manner, an increase of the current flowing through the boosting circuit and the power supply wiring (the power supply terminal 11) is suppressed, and the voltage drop in the power supply wiring and the voltage rise in the GND wiring due to the current increase can be reduced. As a result, decrease of an operation speed of the logic circuit connected to the same power supply wiring and the GND wiring is alleviated. Also, when an SRAM is connected to the same power supply wiring, destruction of a data held in a memory cell of the SRAM is eliminated.

In the boosting circuit according to the present invention, though the peak current between the power supply terminal 2 and the charge pump circuit 3 becomes small, a period of an intermittent operation of the charge pump circuit 3 becomes short so as to keep an electric potential of a boost level, and the number of times of the boosting operation increases. In this manner, while an average current of the conventional boosting circuit is 120 mA, an average current of the boosting circuit according to the present invention is 116 mA, and both of the currents show approximately a same result. That is, regarding the load current of the boosting circuit, the boosting circuit has an ability equivalent to that of the conventional boosting circuit.

As described above, the embodiments of the present invention has been described in detail, but a specific configuration is not limited to those of the above-mentioned embodiments and various modifications are also included in the present invention. In the present embodiment, the boosting circuit has been described as one example, but the embodiments also can be applied to a step-down circuit for stepping-down the voltage to a second power supply voltage VSS lower than the first power supply voltage. For example, by providing a power supply circuit having a similar configuration to the power supply circuit 1 exemplified in the embodiments (a power supply circuit having a current control circuit) between a charge pump circuit for carrying out a step-down operation and a power supply wiring to which the power supply voltage VSS is supplied, a peak current generated between the charge pump circuit and the power supply wiring can be reduced. In this case, a P-channel transistor connected to the power supply wiring is provided for the power supply circuit in place of the N-channel transistors MN1, MN2, and MN3. In addition, an N-channel transistor is provided for the power supply circuit in place of the P-channel transistor MP1 according to the second embodiment.

What is claimed is:

1. A boosting circuit comprising:
a charge pump circuit; and
a power supply circuit configured to supply a power supply voltage to said charge pump circuit,
wherein said power supply circuit comprises:
an N-channel transistor connected with a power supply terminal of said charge pump circuit; and
a current control circuit comprising a resistance element, other than a wiring resistance, connected with a gate of said N-channel transistor through a node, and a capacitance element, other than the gate-source capacitance of said N-channel transistor, connected between said node and said power supply terminal, said current control circuit configured to control current flowing between said N-channel transistor and said charge pump circuit through said power supply terminal,
wherein a gate-to-source voltage of said N-channel transistor is controlled by said resistance element and said capacitance element to be a voltage about equal to a threshold voltage of said N-channel transistor.

2. The boosting circuit according to claim 1, wherein said current control circuit further comprises:
a resistance value of said resistance element is larger than an ON resistance of said N-channel transistor when said gate-to-source voltage of said N-channel transistor is about equal to said threshold voltage of said N-channel transistor.

3. The boosting circuit according to claim 1, wherein a constant voltage is applied to an end of said resistance element which is not connected to said node.

4. The boosting circuit according to claim 2, wherein a said resistance value of said resistance element is over 100 times larger than said ON resistance of said N-channel transistor when said gate-to-source voltage of said N-channel transistor is about equal to said threshold voltage of said N-channel transistor.

5. The boosting circuit according to claim 3, wherein a resistance value of said resistance element is over 100 times larger than an ON resistance of said N-channel transistor when said gate-to-source voltage of said N-channel transistor is about equal to said threshold voltage of said N-channel transistor.

* * * * *